(12) United States Patent
Calvert Rowton

(10) Patent No.: US 10,349,694 B1
(45) Date of Patent: Jul. 16, 2019

(54) HAT WITH EYEWEAR FASTENING DEVICE AND METHOD OF USE

(71) Applicant: Joyce M. Calvert Rowton, Seabrook, TX (US)

(72) Inventor: Joyce M. Calvert Rowton, Seabrook, TX (US)

(*) Notice: Subject to any disclaimer, the term of this patent is extended or adjusted under 35 U.S.C. 154(b) by 171 days.

(21) Appl. No.: 15/461,094

(22) Filed: Mar. 16, 2017

Related U.S. Application Data

(60) Provisional application No. 62/310,444, filed on Mar. 18, 2016.

(51) Int. Cl.
*A42B 1/06* (2006.01)
*A42B 1/24* (2006.01)

(52) U.S. Cl.
CPC .............. *A42B 1/247* (2013.01); *A42B 1/062* (2013.01)

(58) Field of Classification Search
CPC .. A42B 1/247; A42B 1/24; A42B 1/06; A42B 1/062
USPC ........................................................ 2/195.13
See application file for complete search history.

(56) References Cited

U.S. PATENT DOCUMENTS

| | | | | |
|---|---|---|---|---|
| 4,179,753 A * | 12/1979 | Aronberg | ............... | A42B 1/247 2/10 |
| 5,461,727 A * | 10/1995 | Braswell-Moore | .... | A42B 1/247 2/10 |
| 5,491,842 A * | 2/1996 | Braswell-Moore | .... | A42B 1/247 2/10 |
| 5,860,167 A * | 1/1999 | Lizio | ...................... | A42B 1/247 2/209.13 |
| 6,237,159 B1 * | 5/2001 | Martin | ................... | A42B 1/247 2/13 |
| 6,298,495 B1 * | 10/2001 | Totani | ..................... | A42B 1/247 2/10 |
| 6,397,396 B1 * | 6/2002 | Vibert | .................... | A42B 1/247 2/209.12 |
| 6,644,807 B1 * | 11/2003 | Hood | ..................... | A42B 1/247 2/10 |
| 6,647,554 B1 * | 11/2003 | Yan | ........................ | A42B 1/247 2/209.13 |
| 6,671,885 B2 * | 1/2004 | Viggiano | ............... | A42B 1/247 2/195.1 |

(Continued)

*Primary Examiner* — Gloria M Hale
(74) *Attorney, Agent, or Firm* — Eldredge Law Firm, LLC; Richard Eldredge; Beth Felix

(57) ABSTRACT

A baseball cap includes a body configured to fit on a head of a user, the body having a front portion a back portion a first side portion extending from the back portion to the front portion and a second side portion extending from the back portion to the front portion; a brim integral with and extending from the front portion; a first slit extending through a thickness of the first side portion, the first slit is configured to receive a first temple of a pair of sunglasses therethrough; a second slit extending through a thickness of the second side portion, the second slit is configured to receive a second temple of the pair of sunglasses therethrough; a strap having a first end secured to back portion of the body and a second end having a fastener secured thereto, the strap is configured to wrap around a frame of the pair of sunglasses to removably secured the frame to the back portion of the body, the fastener is configured to removably secured to the back portion of the body.

1 Claim, 4 Drawing Sheets

(56) References Cited

U.S. PATENT DOCUMENTS

| | | | | |
|---|---|---|---|---|
| 6,792,619 B1* | 9/2004 | Morris | A42B 1/247 | 2/10 |
| 7,003,809 B1* | 2/2006 | Gordon | A42B 1/241 | 2/209.13 |
| 7,013,491 B2* | 3/2006 | Ferrara | A42B 1/247 | 2/10 |
| 7,275,270 B2* | 10/2007 | Cotutsca | A42B 1/24 | 2/209.13 |
| 7,340,781 B2* | 3/2008 | Clark | A42B 1/247 | 2/209.13 |
| 7,484,845 B2* | 2/2009 | Douglas | A42B 1/247 | 2/209.13 |
| 7,866,813 B2* | 1/2011 | Anhalt | G02C 3/02 | 2/209.13 |
| 7,979,921 B2* | 7/2011 | Cotutsca | A42B 1/247 | 2/209.13 |
| 8,740,379 B2* | 6/2014 | Berger | G02C 3/02 | 351/155 |
| 9,027,165 B2* | 5/2015 | Cunningham | A42B 1/062 | 2/209.13 |
| 9,481,059 B2* | 11/2016 | Malin | B23Q 3/103 | |
| 2003/0024033 A1* | 2/2003 | Viggiano | A42B 1/247 | 2/209.13 |
| 2006/0152671 A1* | 7/2006 | Risso | A42B 1/247 | 351/155 |
| 2009/0056000 A1* | 3/2009 | de Taboada | A42B 1/247 | 2/422 |
| 2009/0284712 A1* | 11/2009 | Brooks | A42B 1/247 | 351/155 |
| 2010/0212067 A1* | 8/2010 | Thomas | A42B 1/247 | 2/209.13 |
| 2010/0231851 A1* | 9/2010 | Anhalt | A42B 1/247 | 351/155 |
| 2011/0314580 A1* | 12/2011 | Vach | A42B 1/247 | 2/10 |
| 2014/0223636 A1* | 8/2014 | Leon | A42B 1/206 | 2/181 |
| 2017/0027263 A1* | 2/2017 | Yurevich | A42B 1/247 | |

* cited by examiner

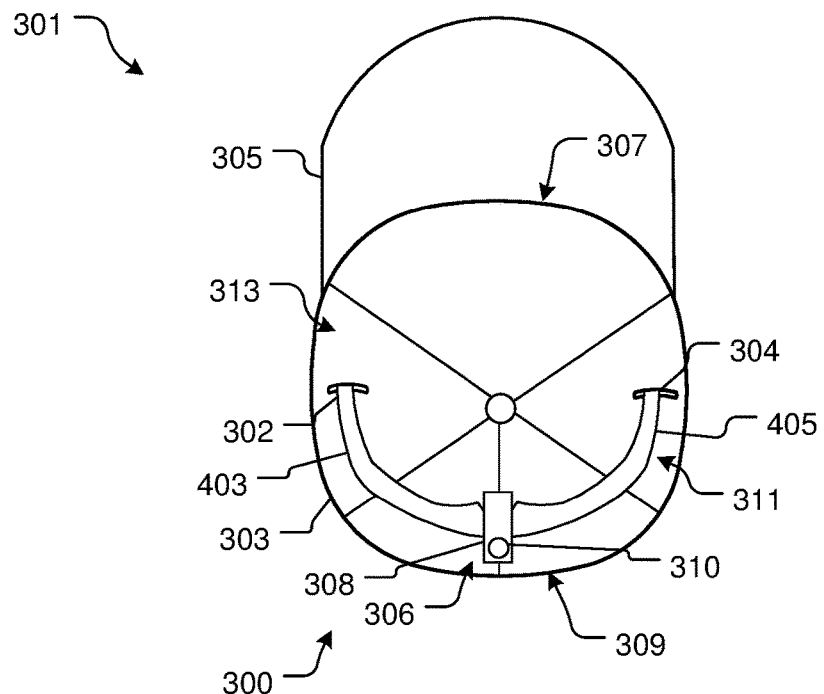
FIG. 5
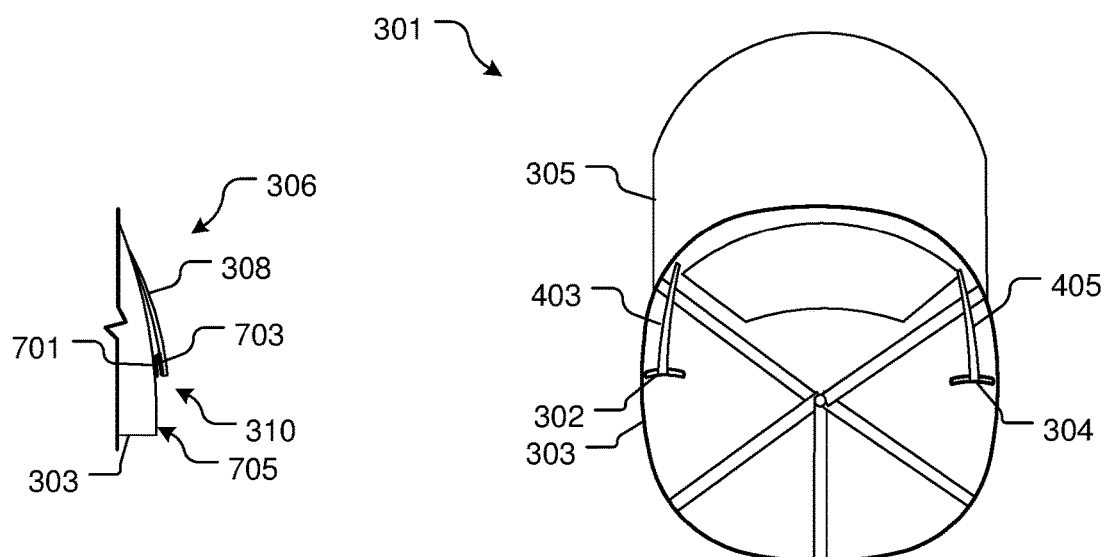
FIG. 7
FIG. 6

HAT WITH EYEWEAR FASTENING DEVICE AND METHOD OF USE

BACKGROUND

1. Field of the Invention

The present invention relates generally to hats and methods to secure eyewear to the hat.

2. Description of Related Art

Baseball caps and other types of hats are well known in the art and are effective means to protect and shade the head from the elements along with providing aesthetically pleasing apparel. For example, FIG. 1 depicts an oblique view of a conventional baseball cap 101 having a body 103 rigidly attached to a brim 105. Body 103 includes a front portion 107, a back portion 109, and two adjoining side portions 111 and 113.

As shown in FIG. 2, it is typically common to place eyewear 201 on cap 101. Specifically, temples 203, 205 secure to respective side portions 111, 113 while from 207 secures to front portion 107. Although effective in most applications of use, it should be understood that the eyewear 201 has a tendency to fall from the cap 101 due to the lack of a fastening device.

Accordingly, there is a need for an eyewear fastening device adapted to secure the eyewear to the cap during use.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIGS. 3-5 are top views of a baseball cap in accordance with a preferred embodiment of the present application;

FIG. 6 is a bottom view of the baseball cap of FIG. 5; and

FIG. 7 is a partial side view of the baseball cap of FIG. 3.

Figure 1:
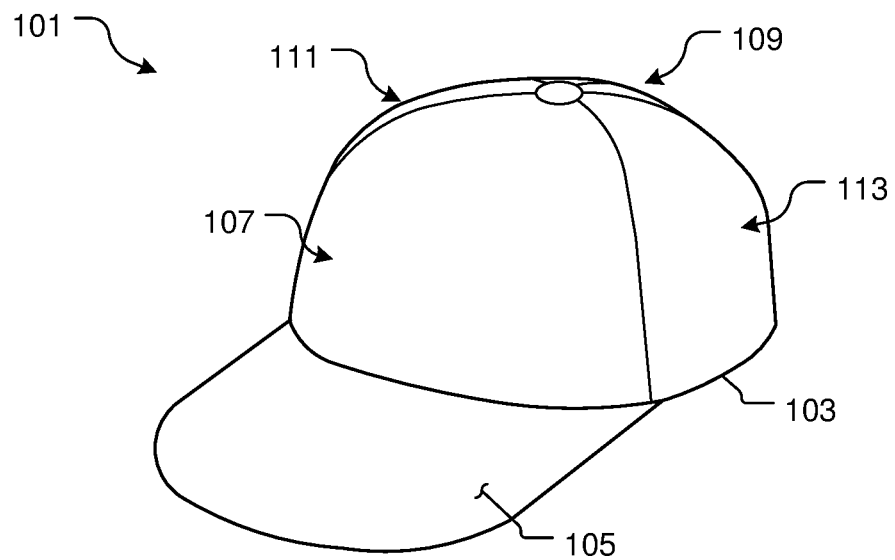
FIG. 1 is an oblique view of a conventional baseball cap.
Figure 2:
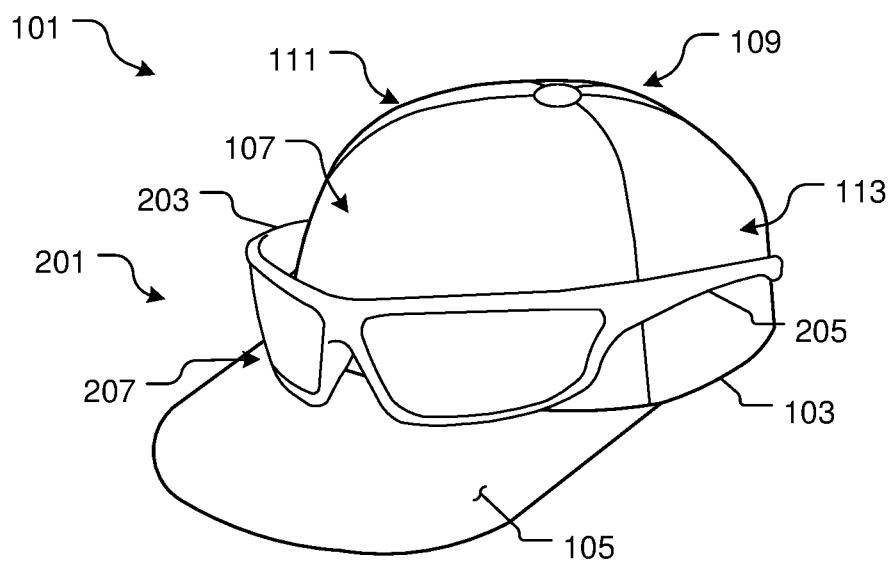
FIG. 2 is an oblique view of the baseball cap of FIG. 1 with eyewear attached thereto.

While the baseball cap and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the baseball cap and method of use of the present application are provided below. It will of course be appreciated that in the development of any actual embodiment, numerous implementation-specific decisions will be made to achieve the developer's specific goals, such as compliance with baseball cap-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The baseball cap and method of use will be understood, both as to its structure and operation, from the accompanying drawings, taken in conjunction with the accompanying description. Several embodiments of the baseball cap are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 3:
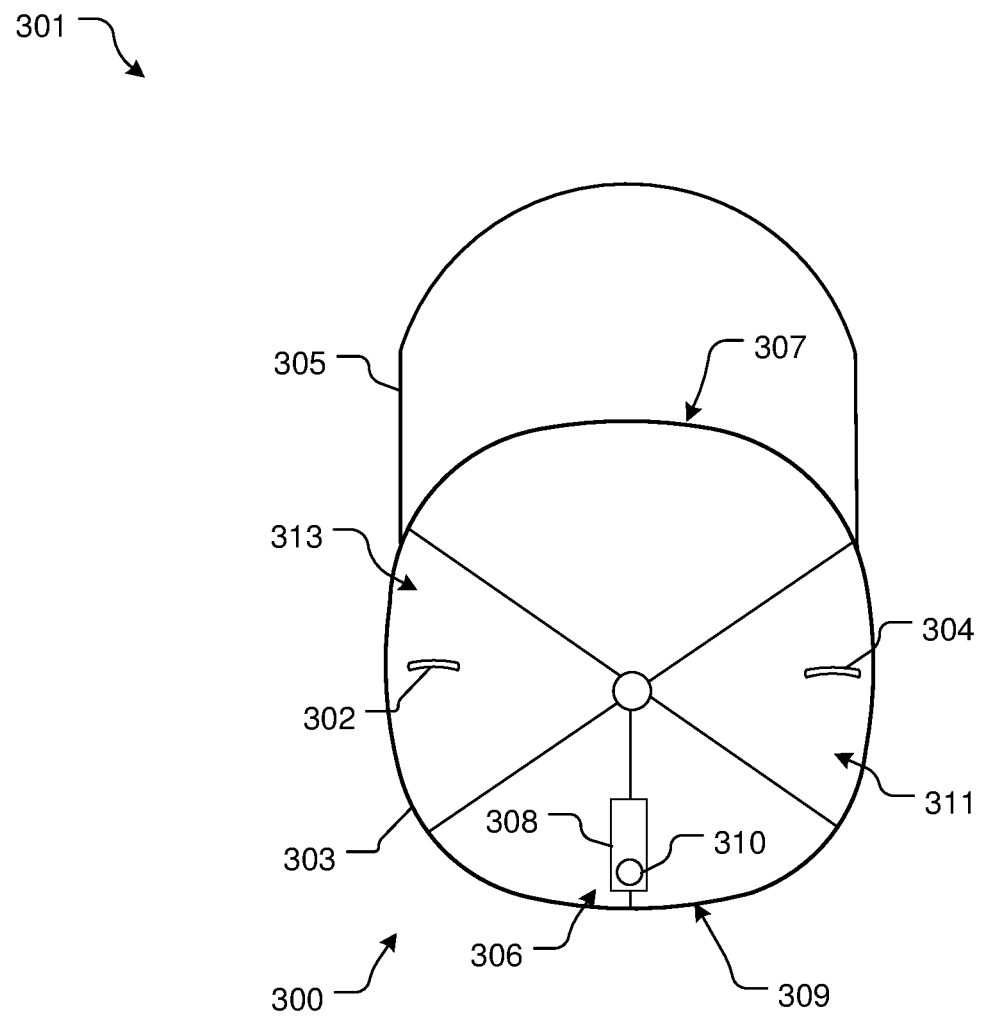
Figure 4:
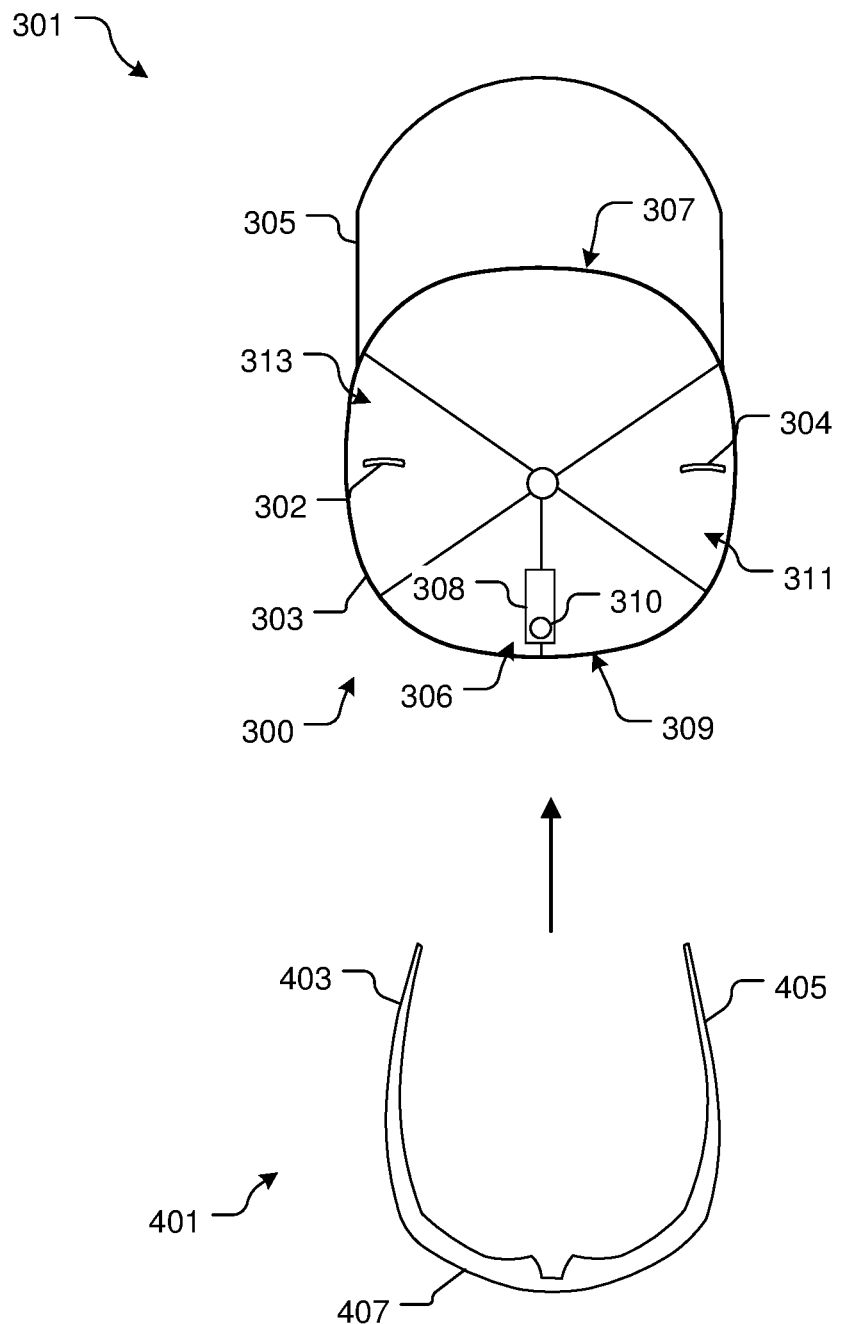

Referring now to the drawings wherein like reference characters identify corresponding or similar elements throughout the several views, FIGS. 3-5 depict top views of a baseball cap 301 in accordance with a preferred embodiment of the present application. It will be appreciated that the baseball cap 301 overcomes one or more of the above-listed problems commonly associated with the conventional baseball caps. Detailed explanation of these differences and unique features of the baseball cap 301 are discussed below with reference to the accompanying drawings.

It should be understood that the features discussed herein are associated with a baseball cap. However, it should be appreciated that it is contemplated utilizing the features discussed herein with other types of hats.

Baseball cap 301 having a body 303 rigidly attached to a brim 305. Body 303 includes a front portion 307, a back portion 309, and two adjoining side portions 311 and 313.

One of the unique features believed characteristic of the present invention is the use of an eyewear fastening device 300 to secure the eyewear 401 to the back portion 309 and to the two adjoining side portions 311, 313. To achieve this feature, fastening device 300 includes one or more of two elongated slits 302, 304 extending through the thickness of body 303 about respective side portions 313, 311. The fastening device 300 is further provided with an eyewear frame attachment 306, which in the preferred embodiment includes a strap 308 rigidly attached to the back portion 309 at one end and releasably attached to the outer surface of the back portion 309 via a locking mechanism 310.

As shown in FIGS. 4 and 5, eyewear 401 is secured to the back portion 309 of the baseball cap 301 via fastening device 300. Specifically, eyewear 401 includes a temples 403, 405 that slide within respective slits 302, 304 and a frame 407 that engages with attachment 306.

In FIG. 7, a partial side view of back portion 309 along with frame attachment 306 is shown. It will be appreciated that various locking mechanisms 310 are contemplated. In the preferred embodiment, locking mechanism 310 includes a first member 701 rigidly attached to body 303 and a second member 703 secured to strap 308. During use, the strap 308 engages with frame 407 and is thereafter secured to back portion 309 via locking mechanism 310. In one contemplated embodiment, the first member 701 could be secured to the outer surface 705 of back portion 309 or disposed within the thickness of back portion 309. Some of the different types of locking mechanisms include hook-loop fasteners, snap, clips, magnets, and other quick-release fasteners.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A baseball cap, comprising:
    a body configured to fit on a head of a user, the body having:
        a front portion;
        a back portion;
        a first side portion extending from the back portion to the front portion; and
        a second side portion extending from the back portion to the front portion;
    a brim integral with and extending from the front portion;
    a first slit extending through a thickness of the first side portion, the first slit is configured to receive a first temple of a pair of sunglasses therethrough;
    a second slit extending through a thickness of the second side portion, the second slit is configured to receive a second temple of the pair of sunglasses therethrough;
    a strap having a first end secured to back portion of the body and a second end having a fastener secured thereto, the strap is configured to wrap around a frame of the pair of sunglasses to removably secure the frame to the back portion of the body, the fastener is configured to removably secured to the back portion of the body;
    wherein the first slit, the second slit, and the strap are configured to secure the pair of sunglasses to the body.

* * * * *